United States Patent
Kawamura

(10) Patent No.: US 6,900,816 B1
(45) Date of Patent: May 31, 2005

(54) IMAGE DISTRIBUTING AND PROCESSING APPARATUS

(75) Inventor: Ichirou Kawamura, Fussa (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 09/391,272

(22) Filed: Sep. 7, 1999

(30) Foreign Application Priority Data

Dec. 28, 1998 (JP) .......................................... 10-373347

(51) Int. Cl.⁷ .............................................. G06T 15/00
(52) U.S. Cl. ...................................................... 345/619
(58) Field of Search ................................ 345/619, 629, 345/634, 418; 438/218, 222

(56) References Cited

U.S. PATENT DOCUMENTS 6,349,240 B2 * 2/2002 Ogawa et al. .............. 700/121
6,721,908 B1 * 4/2004 Kim et al. ................... 714/702

FOREIGN PATENT DOCUMENTS

JP  04189564  7/1992
JP  04326168  11/1992

* cited by examiner

*Primary Examiner*—Phu K Nguyen
(74) *Attorney, Agent, or Firm*—Christie, Parker & Hale, LLP

(57) ABSTRACT

An image distributing and processing apparatus is provided with a distributor which distributes image data outputted from an input data storing device into a plurality of image processing/storing devices in accordance with parameters to be used for the image processing operation, and a reconfiguration device which reconfigures the processed and stored output image data in a predetermined order, with reference to a distribution table. The reconfiguration device can refer to a reconfiguration table in which a relationship, between addresses of a part of output data areas outputted from the image processing/storing devices in accordance with each parameter and addresses of the output data storing device, is stored in advance, in place of the distribution table.

2 Claims, 5 Drawing Sheets

DISTRIBUTION TABLE

| 2 | 8-1~8-n |
|---|---|
| (x0, x1) | (a0, a1) |
| (x2, x3) | (b0, b1) |
| (x4, x5) | (a2, a3) |
| (x6, x7) | (c0, c1) |
| (x8, x9) | (b2, b3) |
| (x10, x11) | (a4, a5) |

DISTRIBUTION TABLE

| x0 − x3 | a0 − a3 |
|---|---|
|  |  |

RECONFIGURATION TABLE

| a1 − a2 | x1 − x2 |
|---|---|
|  |  |

IMAGE DISTRIBUTING AND PROCESSING APPARATUS

BACKGROUND OF THE INVENTION

1. Field of the Invention

The present invention relates to an image distributing and processing apparatus in which images are processed by different image processors in accordance with parameters which are used to process images on a surface of a semiconductor integrated device, such as a semiconductor wafer, a photo-mask, or a liquid crystal display, etc.

In general, the brightness of the surface of the semiconductor integrated device, a pattern density, or the material are different depending on the surface portions of the same semiconductor integrated device. To process images at different surface portions, it is advisable to set different parameters depending on the state of the surface portions to be processed.

2. Description of the Related Art

In a known image processing apparatus, once an image of one semiconductor integrated device is input into an image processor, the image is processed using a parameter inherent to each characteristic, whatever the characteristic, such as the surface contrast, pattern density or the material, is. Therefore, for example, if the image is to be corrected in the brightness thereof, since the parameter inherent to the brightness is constant over the entire surface of the image, it is impossible to correct the image in accordance with the brightness of each surface portion. The same is true for the correction of the image in accordance with the pattern density or material, etc.

Therefore, if a surface portion of the semiconductor integrated device requires an image processed using a parameter and another surface portion requires an image processed using a different parameter, an image of the surface of the semiconductor integrated device is picked up and is processed using a parameter and thereafter, an image of the surface of the semiconductor integrated device is picked up and processed using another parameter, in the prior art.

Therefore, in the prior art, in order to process images of different surface portions of a semiconductor integrated device, using different parameters, it is necessary to obtain images the number of which is identical to the number of the parameters and to apply different parameters to the respective images to thereby combine the images corresponding to the parameters, whereby a corrected image can be obtained. Accordingly, the image processing operation is extremely troublesome and requires long time.

SUMMARY OF THE INVENTION

The primary object of the present invention is to provide an image distributing and processing apparatus in which the efficiency of the image processing operation using different parameters corresponding to the surface characteristics of a semiconductor integrated device can be enhanced.

Another object of the present invention is to provide an image distributing and processing apparatus in which only a desired image can be selected, based on the outcome of the image processing operation.

To achieve the object mentioned above, according to the present invention, there is provided an image distributing and processing apparatus comprising an input data storing device in which input image data is stored in a predetermined order; a plurality of image processing/storing devices; a distribution table in which a relationship between addresses of the input data storing device and addresses of output data outputted from the plural image processing/storing devices is stored in advance in accordance with parameters to be used for the image processing operation; a distributor which distributes the image data outputted from the input data storing device into the plural image processing/storing devices in accordance with the content of the distribution table; a reconfiguration device which reconfigures the output image data processed and stored by the plural image processing/storing devices in the above mentioned predetermined order, with reference to the distribution table; and an output data storing device which stores therein output image data outputted from the reconfiguration device.

With the preparation of the distribution table, the input data can be distributed to different image processing/storing devices in accordance with different parameters and, hence an operation to obtain and process an image every time the parameter is modified is not needed. Consequently, not only can the image be processed within a short space of time but also the efficiency of the image processing operation can be enhanced.

It is possible to use a reconfiguration table in which a relationship between addresses of a part of output data areas outputted from the plural image processing/storing devices in accordance with each parameter and the addresses of the output data storing device is stored in advance, in place of the distribution table. The image data can be reconfigured referring to the reconfiguration table and can be stored in the output data storing device.

Since only a part of the output data area outputted from the image processing/storing devices is stored in the output data storing device, only the effective data must be stored in the output data storing device and thus the evaluation of the output image can be simplified.

BRIEF EXPLANATION OF THE DRAWINGS

The invention will be discussed below in detail with reference to the accompanying drawings, in which;

FIG. 2 is a diagram showing the contents of a distribution table shown in FIG. 1, by way of example;

DESCRIPTION OF THE PREFERRED EMBODIMENTS

<Embodiment 1>

Figure 1:
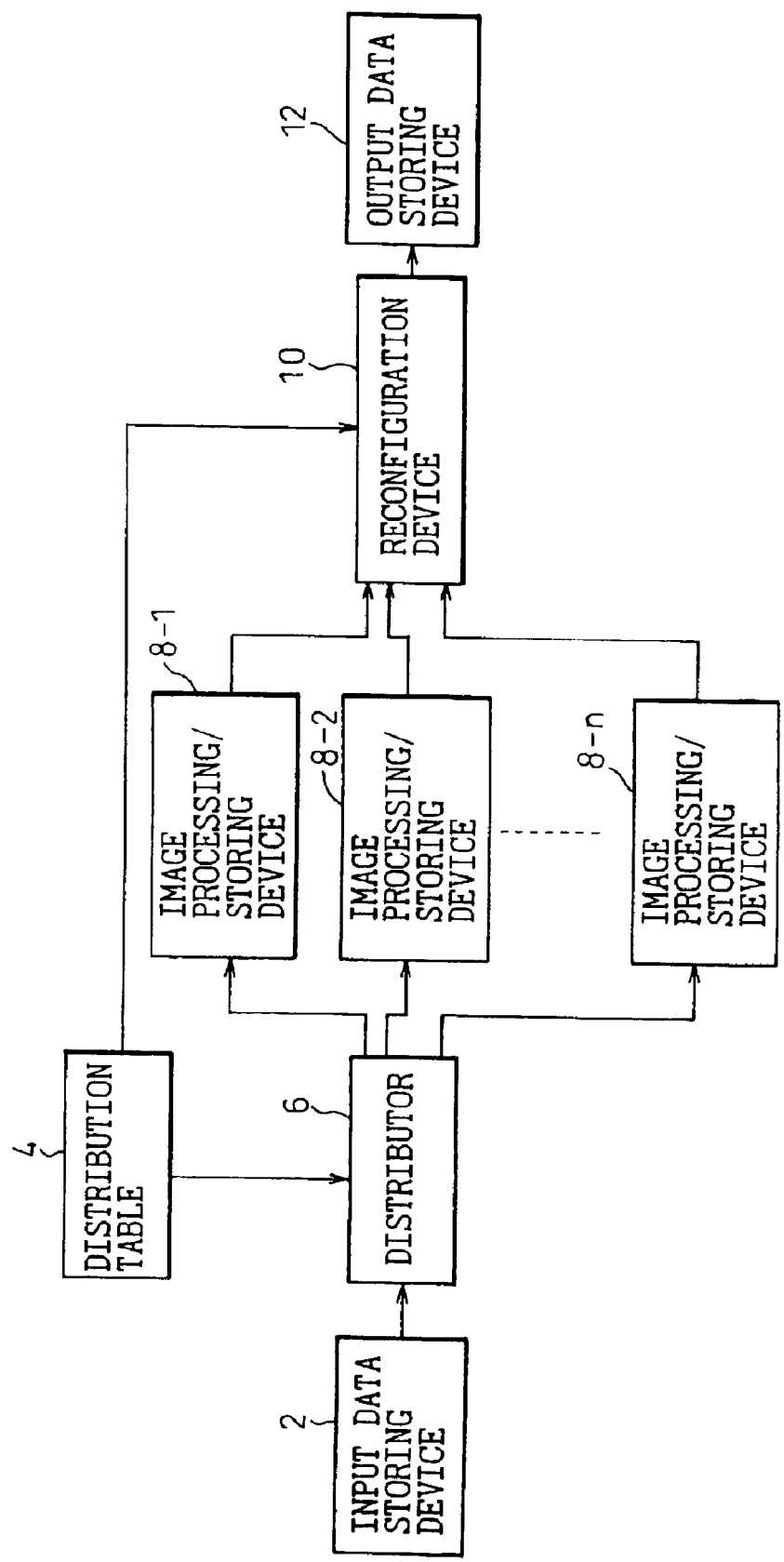
FIG. 1 is a block diagram of an internal structure of an image distributing and processing apparatus according to a first embodiment of the present invention.

FIG. 1 shows a block diagram of a first embodiment of an image distributing and processing apparatus according to the present invention. In FIG. 1, the image distributing and processing apparatus is comprised of an input data storage device 2 which stores therein input image data in a predetermined sequence, a plurality of image processing/storing devices 8-1, 8-2, . . . 8-n, a distribution table in which a correspondence between the addresses of the input data storing device and the addressed of the output data from the plural image processing/storing devices 8-1 to 8-n is stored in advance, corresponding to parameters to be used in the image processing operation, a distributor 6 which distributes the image data outputted from the input data storing device into the plural image processing/storing devices in accordance with the content of the distribution table, a reconfiguration device 10 which reconfigures the output image data processed and stored in the plural image processing/storing devices 8-1 to 8-n in a predetermined sequence, referring to the distribution table, and an output data storing device 12 which stores therein the output image data outputted from the reconfiguration device 10.

In operation, the input image data which is obtained by picking up the surface of an object to be examined, using an image pickup device (not shown) which is comprised, in combination, of an optical microscope and an image pickup element such as TDI (Time Delay Integration) is stored serially or in parallel in the input data storing device 2. The distributor 6 distributes the image data outputted from the input data storing device 2 into the image processing/storing devices 8-1 to 8-n corresponding to the addresses of the input data storing device 2, with reference to the distribution table 4. Each image processing/storing device processes the input image data and stores the outcome in the memory areas designated by the distribution table 4. The reconfiguration device 10 reconfigures the output image data supplied from the image processing/storing devices 8-1 to 8-n in the same order as those stored in the input data storing device 2, with reference to the distribution table 4 and stores the same in the output data storing device 12.

FIG. 2 shows an example of the content of the distribution table shown in FIG. 1. In FIG. 2, X0 to Xll represent addresses of the input data storing device 2; a0 to a5 represent the addresses of the image processing/storing device 8-1; b0 to b3 represent the addresses of the image processing/storing device 8-2; c0 to c2 represent the addresses of the image processing/storing device 8-n, respectively. In this distribution table 4, the addresses (X0, Xl) of the input data storing device correspond to the addresses (a0, a1) of the image processing/storing device 8-1 and the addresses (X2, X3) of the input data storing device correspond to the addresses (b0, b1) of the image processing/storing device 8-2, respectively. The same is true for the remaining addresses of the input data storing devices and image processing/storing devices.

The correspondence is predetermined based on the images at each object image pickup stage to show parameters to be used for the corresponding image portions.

Figure 3:
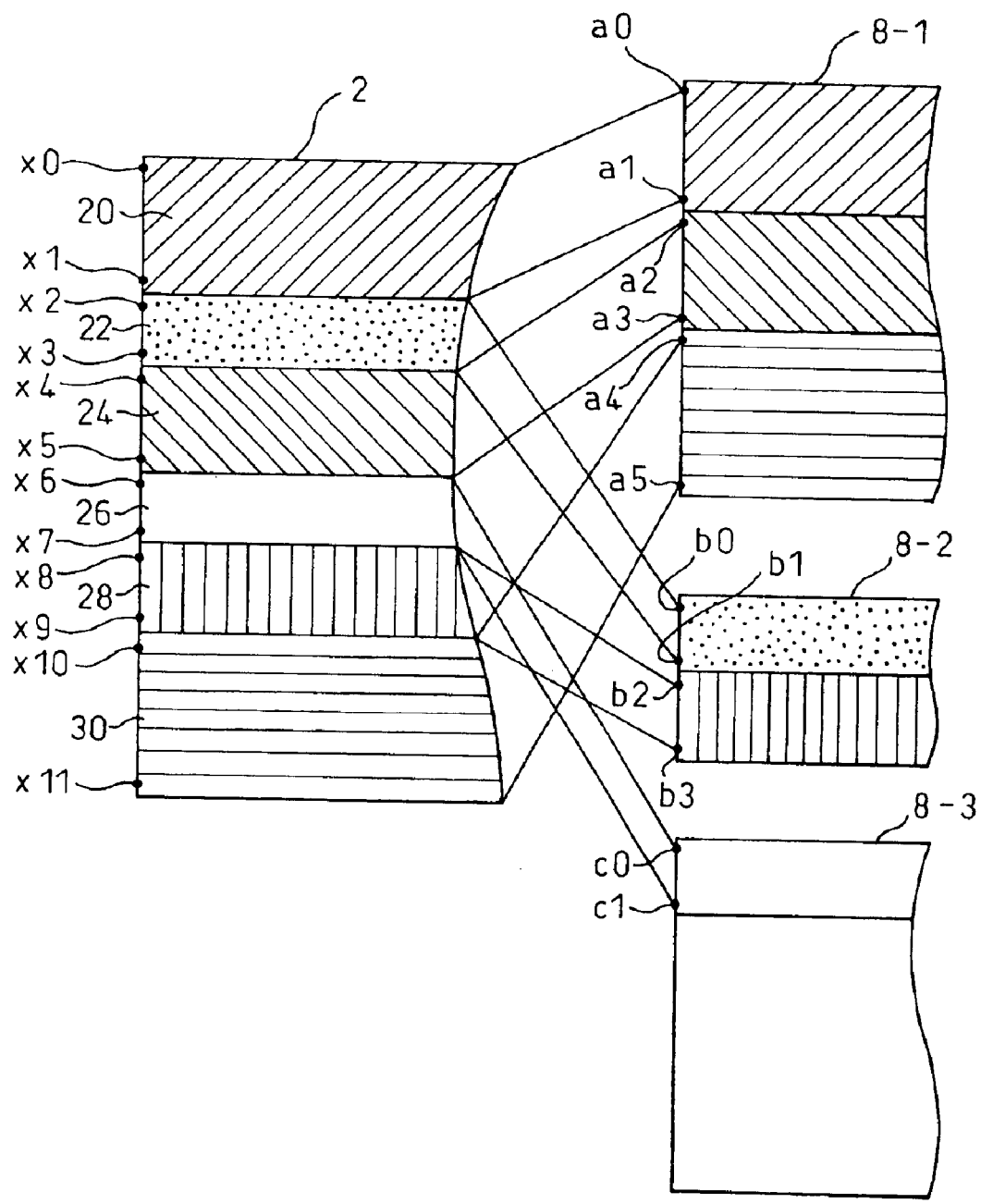
FIG. 3 is a schematic view showing a relationship between addresses of an input data storage device 2 and addresses of image processing/storing devices 8-1 to 8-n, shown in FIG. 1, by way of example.

FIG. 3 shows an example of a relationship between the addresses of the input data storing device 2 and those of the image processing/storing devices 8-1 to 8-n, shown in FIG. 1. In the illustrated embodiment, the data within the input data storing device 2 includes data 20 of the addresses X0 to Xl, data 22 of the addresses X2 to X3, data 24 of the addresses X4 to X5, data 26 of the addresses X6 to X7, data 28 of the X8 to X9 and data 30 of the addresses X10 to Xll.

The data 20, 22, 24, 26, 28 and 30 are data to be image-processed using different parameters such as different contrasts. Each address represents that of an end portion of each data area in the illustrated embodiment. Therefore, the address next to the last address Xl within the data area 20 is the first address X2 in the data area 22. The same is true for the remaining addresses. Although the data areas are continuous in the drawing, it is possible to provide a gap between the data areas.

As can be seen from the drawings, in accordance with the content of the distribution table shown in FIG. 2, the addresses (X0, X1) of the input data storing device 2 correspond to the addresses (a0, a1) of the image processing/storing device 8-1; the addresses (X2, X3) of the input data storing device 2 correspond to the addresses (b0, b1) of the image processing/storing device 8-2; the addresses (X4, X5) of the input data storing device 2 correspond to the addresses (a2, a3) of the image processing/storing device 8-1; the addresses (X6, X7) of the input data storing device 2 correspond to the addresses (c0, c1) of the image processing/storing device 8-n; the addresses (X8, X9) of the input data storing device 2 correspond to the addresses (b2, b3) of the image processing/storing device 8-2; the addresses (X10, X11) of the input data storing device 2 correspond to the addresses (a4, a5) of the image processing/storing device 8-1, respectively.

According to the relationship mentioned as above, for example, the input data 20 is distributed to the corresponding image processing/storing device 8-1 and is processed using a parameter inherent to the device. The process result is stored at the addresses a0 to a1 of the device.

The reconfiguration device 10 rearranges the processed image data stored in the image processing/storing devices 8-1 to 8-n in the original order, with reference to the distribution table 4 and stores the same in the output data storing device 12.

Thus, the images can be processed in parallel using different parameters for the respective data areas of the input image, using the input image data which has been obtained by a single pickup operation and, hence the image processing operation efficiency can be enhanced.

<Embodiment 2>

Figure 4:
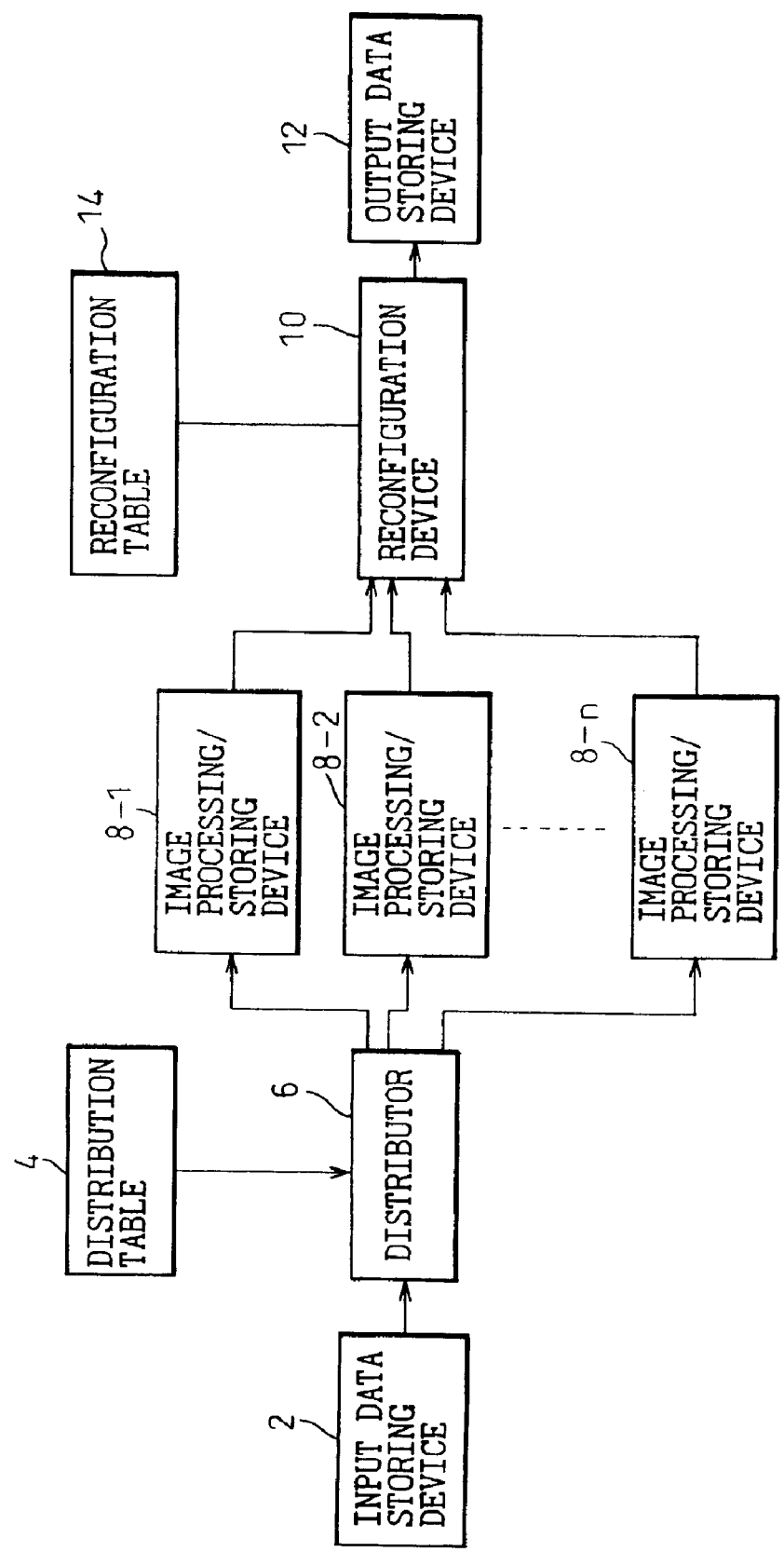
FIG. 4 is a block diagram of an internal structure of an image distributing and processing apparatus according to a second embodiment of the present invention.

FIG. 4 shows a block diagram of a second embodiment of an image distributing and processing apparatus according to the present invention. In FIG. 4, the elements corresponding to those in FIG. 1 are designated by like numerals and duplicate explanations will not be given below. A difference, compared to FIG. 1, resides in the point that the reconfiguration device 10 refers to a reconfiguration table in place of reference to the distribution table.

In general, all the image data obtained as a result of the image processing operation are not always used as output data. For instance, in case that the mean value of the gray level of 3×3 pixels with respect to a central image pixel or the range value which represents a difference between the maximum value and the minimum value of the gray level is determined to be a gray level of the central pixel, since no mean value or range value of the pixels at the end portions the image can be obtained, the pixels at the end portions of the image must be excluded from the output data. Alternatively, there is a case that only necessary data is to be outputted from the processed image data.

To this end, in the second embodiment, the reconfiguration table 14 stores in advance a relationship between the areas corresponding to the output data areas outputted from the plural image processing/storing devices 8-1 to 8-n corresponding to each parameter from which the output data areas the opposed edge portions have been removed and the addresses of the memory areas of the output data storing device 12.

Figures 5, 6, 7:
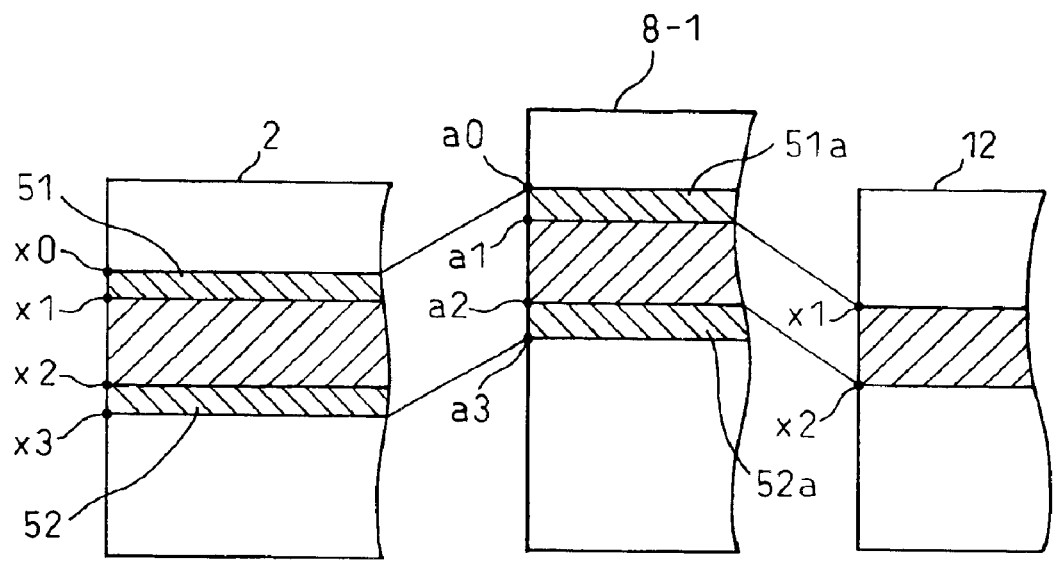
FIG. 5 is a schematic view showing relationships between memory areas of an input data storage device 2, the memory areas of image processing/storing devices 8-1 to 8-n and memory areas of an output data storage device 12 shown in FIG. 4, by way of example.
FIG. 6 is a diagram showing a part of the contents of a distribution table shown in FIG. 4.
FIG. 7 is a diagram showing a part of the contents of a reconfiguration table shown in FIG. 4.

FIG. 5 shows a relationship between the memory area of the input data storing device 2, the memory area of the image processing/storing device 8-1 and the memory area of the output data storing device 12, in the second embodiment. FIG. 6 shows a part of the contents of the distribution table 4 in the second embodiment. FIG. 7 shows a part of the contents of the reconfiguration table 14 in the second embodiment. In an example shown in FIG. 5, the data between the address from X0 to X3 of the input data storing device 2 includes, at its opposed ends, edge portions 51 and 52. The addresses of the edge portion 51 are assigned X0 to X1. The addresses of the edge portion 52 are assigned X2 to X3. As may be understood from FIGS. 5 to 7, the data at the addresses X0 to X3 of the input data memory device 2 is processed by the image processing/storing device 8-1 in the same way as that in the first embodiment, and is stored at the addresses a0 to a3 in accordance with the distribution table 4. Among the stored image data, the addresses of the edge portion 51a are a0 to a1 and those of the edge portion 52a are a2 to a3. The reconfiguration device 10 stores only the data at the addresses a1 to a2, within the image processing/storing device 8-1, in the output data storing device 12 in accordance with the content of the reconfiguration table 14 without transferring the data of the edge portions 51a and 52a to the output data storing device 12.

The remaining image processing/storing devices are not shown in FIG. 5, but the reconfiguration table specifies the relationship between the addresses of the image processing/storing devices and the addresses of the output data storing device 12. Consequently, the data from the respective image processing/storing devices are stored in a predetermined order into the output data storing device 12 in the same way as shown in FIG. 5. Thus, only the necessary data is stored in the output data storing device 12.

As can be understood from the above discussion, according to the present invention, since the images can be processed in parallel in accordance with different parameters for each data area of the input image, using input image data which has been obtained by a single image pickup operation, the efficiency of the image processing operation can be increased. Moreover, processed data from which unwanted data portions have been removed can be obtained.

What is claimed is:

1. An image distributing and processing apparatus comprising:

an input data storing device in which input image data is stored in a predetermined order;

a plurality of image processing/storing devices;

a distribution table in which a relationship between addresses of the input data storing device and addresses of output data outputted from the plural image processing/storing devices is stored in advance in accordance with parameters to be used for the image processing operation;

a distributor which distributes the image data outputted from the input data storing device into the plural image processing/storing devices in accordance with content of the distribution table;

a reconfiguration device which reconfigures the output image data processed and stored by the plural image processing/storing devices in the above mentioned predetermined order, with reference to the distribution table; and an output data storing device which stores therein output image data outputted from the reconfiguration device.

2. An image distributing and processing apparatus comprising:

an input data storing device in which input image data is stored in a predetermined order;

a plurality of image processing/storing devices;

a distribution table in which a relationship between addresses of the input data storing device and addresses of output data outputted from the plural image processing/storing devices is stored in advance in accordance with parameters to be used for an image processing operation;

a distributor which distributes image data outputted from the input data storing device into the plural image processing/storing devices in accordance with content of the distribution table;

a reconfiguration device which reconfigures image data processed by the plural image processing/storing devices;

an output data storing device Which stores therein output image data outputted from the reconfiguration device; and a reconfiguration table in which a relationship between addresses of a part of output data areas outputted from the plural image processing/storing devices in accordance with each parameter and addresses of the output data storing device is stored in advance;

wherein said reconfiguration device reconfigures the image data, processed by the plural image processing/storing devices, by referring to the reconfiguration table.

* * * * *